United States Patent
Lee et al.

(10) Patent No.: US 7,956,893 B2
(45) Date of Patent: Jun. 7, 2011

(54) METHOD OF INDEXING LAST PITCHING SHOTS IN A VIDEO OF A BASEBALL GAME

(75) Inventors: Shih-Hung Lee, Taipei (TW);
 Chia-Hung Yeh, Tai-Nan (TW);
 Hsuan-Huei Shih, Taipei (TW);
 Chung-Chieh Kuo, Taipei (TW)

(73) Assignee: MAVs Lab. Inc., Songshan Dist., Taipei (TW)

( * ) Notice: Subject to any disclaimer, the term of this patent is extended or adjusted under 35 U.S.C. 154(b) by 1212 days.

(21) Appl. No.: 11/608,847

(22) Filed: Dec. 11, 2006

(65) Prior Publication Data
US 2008/0140232 A1 Jun. 12, 2008

(51) Int. Cl.
*G06F 19/00* (2011.01)
*H04N 7/18* (2006.01)
*H04N 5/225* (2006.01)
*G06K 9/00* (2006.01)
*G06K 9/66* (2006.01)

(52) U.S. Cl. ........ 348/169; 348/135; 382/168; 382/195; 700/91

(58) Field of Classification Search .................. None
See application file for complete search history.

(56) References Cited

U.S. PATENT DOCUMENTS

| 2002/0140816 A1* | 10/2002 | McGrath et al. ............. 348/180 |
| 2005/0254685 A1 | 11/2005 | Miyamori |
| 2006/0112337 A1 | 5/2006 | Jung |
| 2006/0114992 A1 | 6/2006 | Shibata |

FOREIGN PATENT DOCUMENTS

| JP | P2006203498 A | 8/2006 |
| WO | 2006022394 A2 | 3/2006 |
| WO | 2006076760 A1 | 7/2006 |

OTHER PUBLICATIONS

Machine Translation of JP 2006-203498.*
Wen-Nung Lie et al., "Combining caption and visual features for semantic event classification of baseball video," Multimedia and Expo, Dec. 31, 2005, ICME 2005, IEEE International Conference.
Dongqing Zhang et al., "Event Detection in Baseball Video Using Superimposed Caption Recognition," ACM, multimedia'02, Dec. 1-6, 2002, Juan-les-Pins, France, p. 315-318.

* cited by examiner

*Primary Examiner* — Joseph G Ustaris
*Assistant Examiner* — Frederick Bailey
(74) *Attorney, Agent, or Firm* — Winston Hsu; Scott Margo (57) ABSTRACT

A method of indexing final pitching shots for each batter in a video recording of a baseball game is disclosed. The method includes locating pitching video frames in the video, identifying individual pitching shots contained in the video, determining which of the pitching shots is a final pitching shot for each batter in the baseball game, and creating an index of the final pitching shots.

7 Claims, 9 Drawing Sheets

METHOD OF INDEXING LAST PITCHING SHOTS IN A VIDEO OF A BASEBALL GAME

BACKGROUND OF THE INVENTION

1. Field of the Invention

The present invention relates to indexing video recordings of baseball, and more specifically, to a method of indexing last pitching shots in a baseball game video recording.

2. Description of the Prior Art

Watching an entire televised baseball game can take several hours, and only a fraction of that time has any exciting action taking place in the game. A lot of time is spent on commercials, waiting for a batter to come up to bat, waiting for the pitcher to pitch the ball, etc. Most highlights of the game occur when the pitcher throws a final pitch to batters. With the last pitch, the batter can be struck out, fielded out, walked, or the batter may get a hit.

With video recording technology becoming more prevalent and more powerful in recent times, a way to quickly index different parts of baseball games for generating highlights is greatly desired. In this way, exciting parts of the baseball games can be organized and viewed for generating highlights.

SUMMARY OF THE INVENTION

It is therefore one of the objectives of the claimed invention to provide a method of indexing final pitching shots in a video recording of a baseball game in order to solve the problem mentioned above.

According to the claimed invention, a method of indexing final pitching shots for each batter in a video recording of a baseball game is disclosed. The method includes locating pitching video frames in the video, identifying individual pitching shots contained in the video, determining which of the pitching shots is a final pitching shot for each batter in the baseball game, and creating an index of the final pitching shots.

It is an advantage of the claimed invention that the indexing method allows users to quickly locate and view the final pitches thrown to each batter, allowing highlights to be compiled easily.

These and other objectives of the present invention will no doubt become obvious to those of ordinary skill in the art after reading the following detailed description of the preferred embodiment that is illustrated in the various figures and drawings.

DETAILED DESCRIPTION

A video clip of a baseball game is made up of a large number of video frames. For convenience, the video can be divided into a collection of video shots. The focus of this invention is on pitching shots. Each time the pitcher pitches the ball to the batter, a pitching shot is recorded. Because the most exciting highlights invariably occur during the last pitching shot for a batter, this invention aims to create an index of the last pitching shots for all batters in the video of the baseball game.

Figure 1:
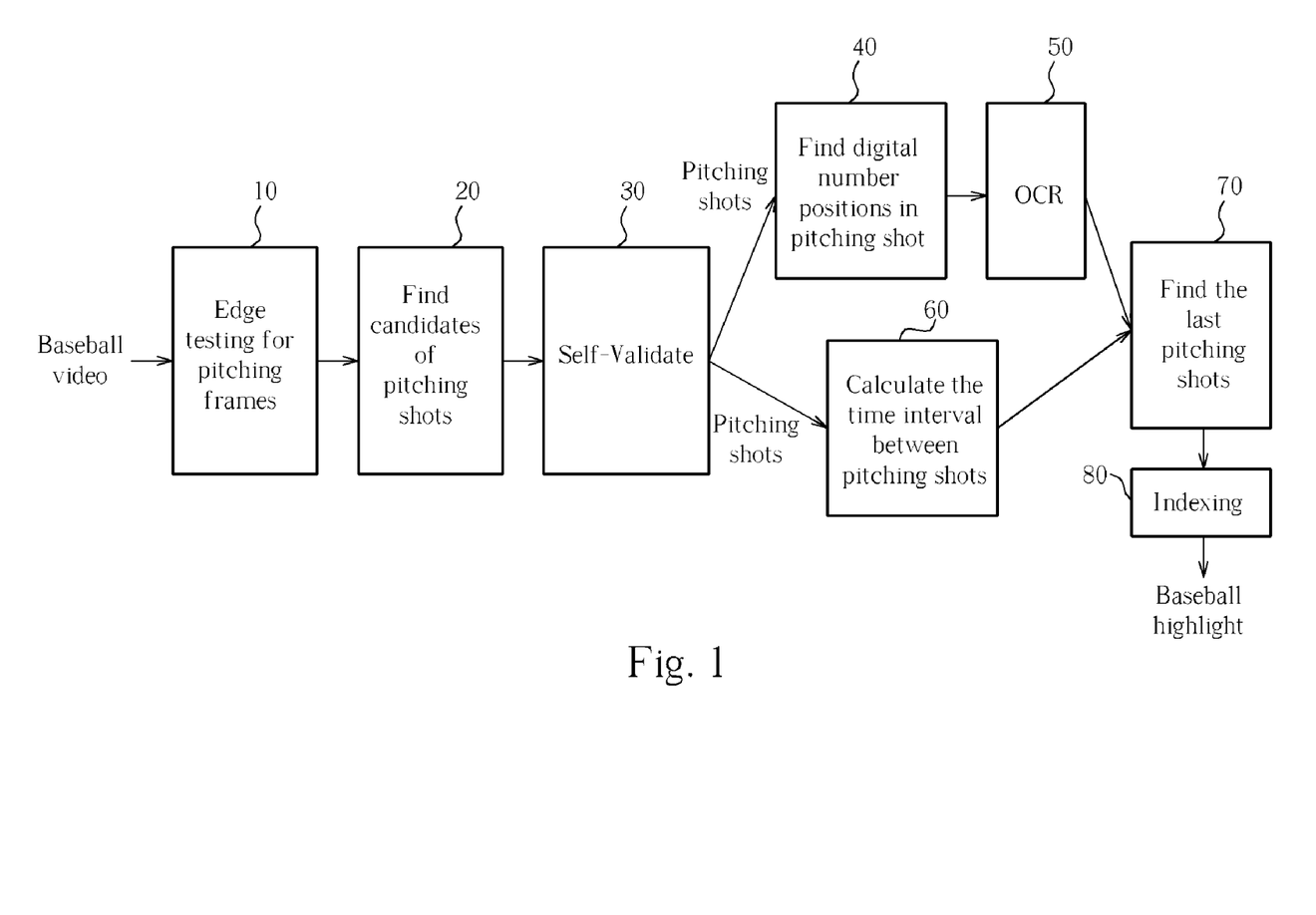
FIG. 1 is a flowchart of a preferred embodiment of a method of indexing final pitching shots for each batter shown in a video recording of a baseball game.

Please refer to FIG. 1. FIG. 1 is a flowchart of a preferred embodiment of a method of indexing final pitching shots for each batter shown in a video recording of a baseball game. The steps of the indexing method are described as follows:

Step 10: Perform edge testing on a baseball video clip to detect pitching frames.

Step 20: Finding candidates pitching shots which contain detected pitching frames.

Step 30: Perform a self-validation process to verify that the pitching shot candidates are actually pitching shots. Once the pitching shots are found, steps 40 and 50 can be followed, step 60 can be followed instead, or steps 40 and 50 along with 60 can all be followed.

Step 40: Find the positions of digital numbers superimposed on the pitching shot.

Step 50: Perform optical character recognition (OCR) on the superimposed numbers to obtain numerical information about the current status and scoring of the baseball game.

Step 60: Calculate the time interval between successive pitching shots.

Step 70: Determine which pitching shots are the final pitching shots for each batter.

Step 80: Create an index of the final pitches for each batter, which can be used to generate highlights of the baseball game.

Figure 2:
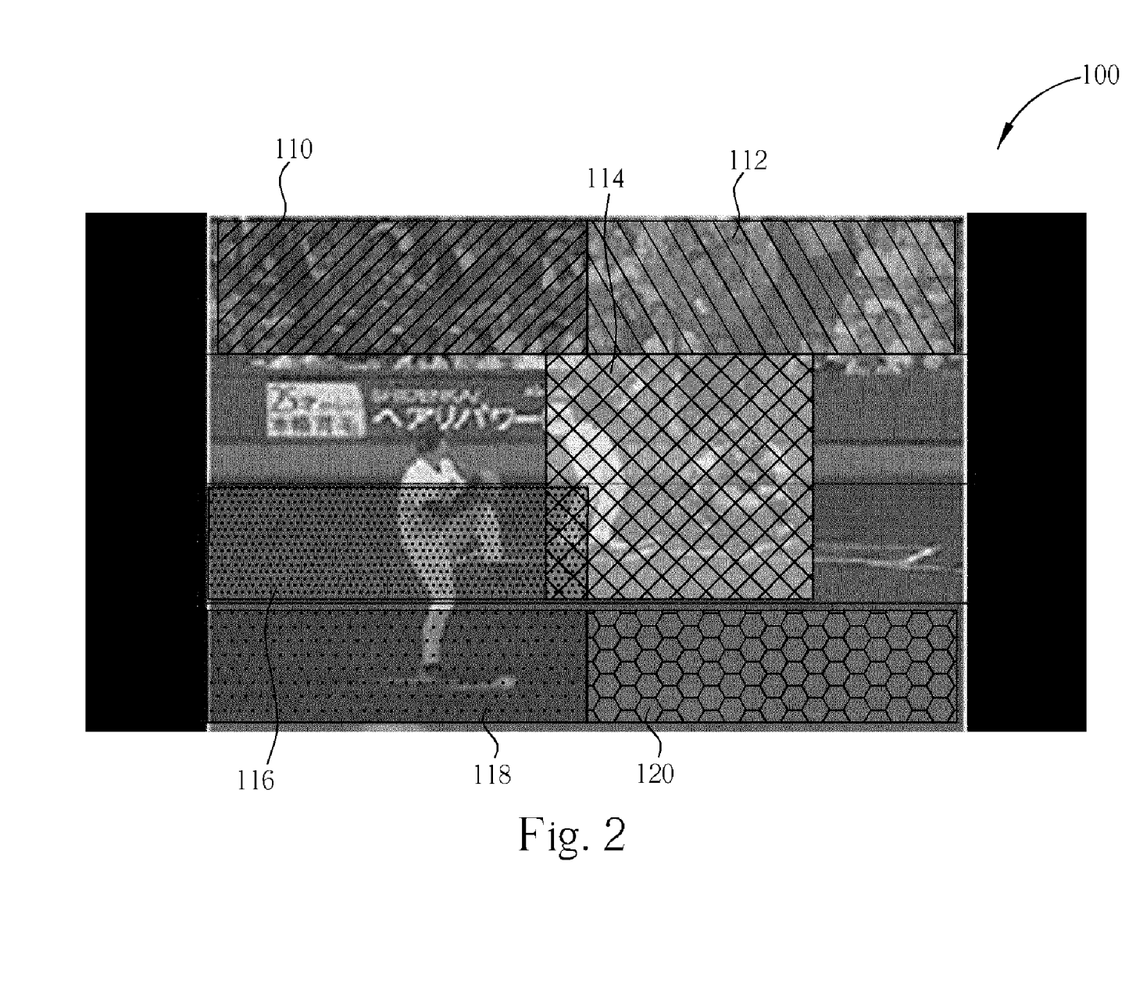
FIG. 2 illustrates a video frame divided into a plurality of areas for undergoing edge testing.

Please refer to FIG. 2. In FIG. 2, a video frame 100 is divided into a plurality of areas 110, 112, 114, 116, 118, 120 for undergoing edge testing. The objects in a video frame of a pitching shot are very stable since the batter, the pitcher, the catcher, and the umpire do not move a great deal. Therefore, the edges of these objects can be used for edge testing by analyzing the general area in which the objects are located. For instance, area 114 contains the batter and the catcher. Please note that the areas can be moved around depending on various factors, and are not fixed. For example, area 114 can be moved horizontally depending on whether the batter is left handed or right handed.

Figure 3:
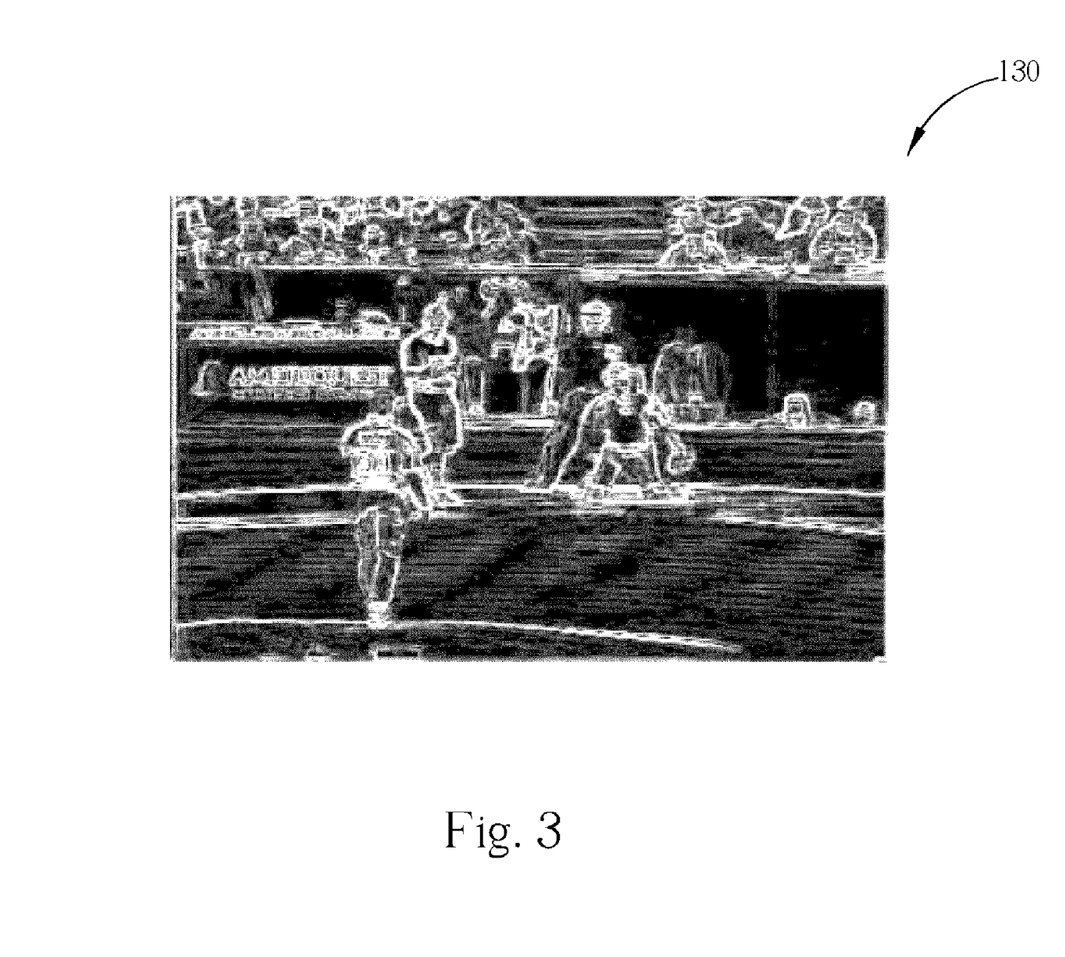
FIG. 3 shows a video frame undergoing an edge testing process.

Please refer to FIGS. 2 and 3. FIG. 3 shows a video frame undergoing an edge testing process. The white pixels represent the edges of objects, and the black pixels are all other areas besides the edges.

In order to detect pitching shots, several filtering rules are applied by utilizing edge testing:

Rule 1:

$$\text{Upper area complexity} = \min\left(\frac{\text{\# of Edges in area 114}}{\text{total area of area 114}},\right.$$
$$\left.\max\left(\frac{\text{\# of Edges in area 110}}{\text{total area of area 110}}, \frac{\text{\# of Edges in area 112}}{\text{total area of area 112}}\right)\right)$$

Rule 2:

$$\text{Upper area complexity} > \left(\frac{\text{\# of Edges in area 116}}{\text{total area of area 116}} * 0.94\right)$$

Rule 3:

$$\frac{\text{\# of Edges in area 114}}{\text{total area of area 114}} > \frac{\text{\# of Edges in area 118}}{\text{total area of area 118}} * 1.1$$

In the rules above, the label "# of Edges" refers to the number of edge pixels in an area, and the label "total area" refers to the total number of pixels in an area. Please keep in mind that other methods of performing edge testing can also be used.

Figure 4:
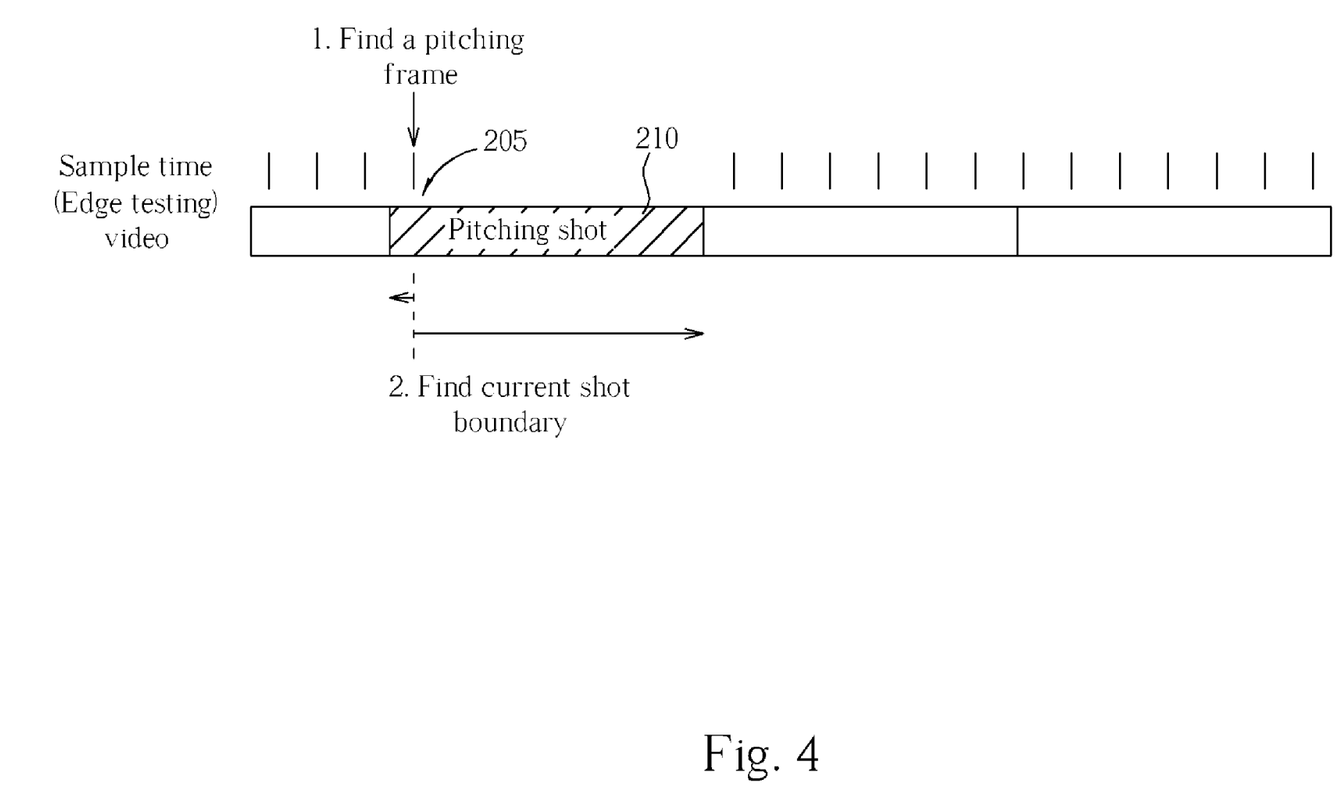
FIG. 4 illustrates performing edge testing on sample video frames for detecting pitching shots.

Please refer to FIG. 4. FIG. 4 illustrates performing edge testing on sample video frames for detecting pitching shots. To detect the presence of a pitching shot, various video frames undergo edge testing. Since the pitching shots are quite stable, and might only have a little camera panning, a histogram difference can be used to find a pitching shot which contains a frame passing the edge testing. For example, video frames can be tested after every second. As shown in FIG. 4, once a pitching frame 205 is found, the surrounding frames will be analyzed to determine the starting frame and the ending frame of a current pitching shot 210.

The above processes produce pitching shot candidates. A self-validation process is then run on the pitching shot candidates in order to filter out any detected shots that were not actually pitching shots. For each pitching shot candidate, histogram differences are calculated between the pitching shot candidate and other pitching shot candidates respectively, and then the histogram differences are accumulated to generate a difference value. Pitching shot candidates having smallest difference values are then chosen as the desired pitching shots.

Now that the pitching shots have been identified, the final pitching shots for each batter are identified based on the time intervals between pitching shots or using OCR. Since the pitching shots have already been found, the whole baseball game can be divided into segments starting from these pitching shots. However, we still need to decide which segments are more interesting than others. Basically, only the segments that cause a batter change are more important. The other segments just change the count of balls and strikes, and do not have a large effect on the game.

Common highlights include homeruns, strike outs, and instances of excellent defense. These three common types of highlights almost always cause a batter change. Therefore, it is important to locate and index the last pitching shot for each batter for generating highlights.

The time interval between two pitching shots is an important hint. If something special has happened, the time interval will be longer than the interval after an uninteresting segment. An example of an uninteresting segment is when the pitcher throws a ball and the catcher throws it back to the pitcher for another pitch to the same batter. In the contrast, if the batter hits the ball, the defending team needs to catch the ball and throw it back to the pitcher. The process needs more time. Usually, highly exciting segments will have large time intervals since there is more action, such as bases being run. Hence, we could simply extract the segments with long time interval as our highlights.

Figure 5:
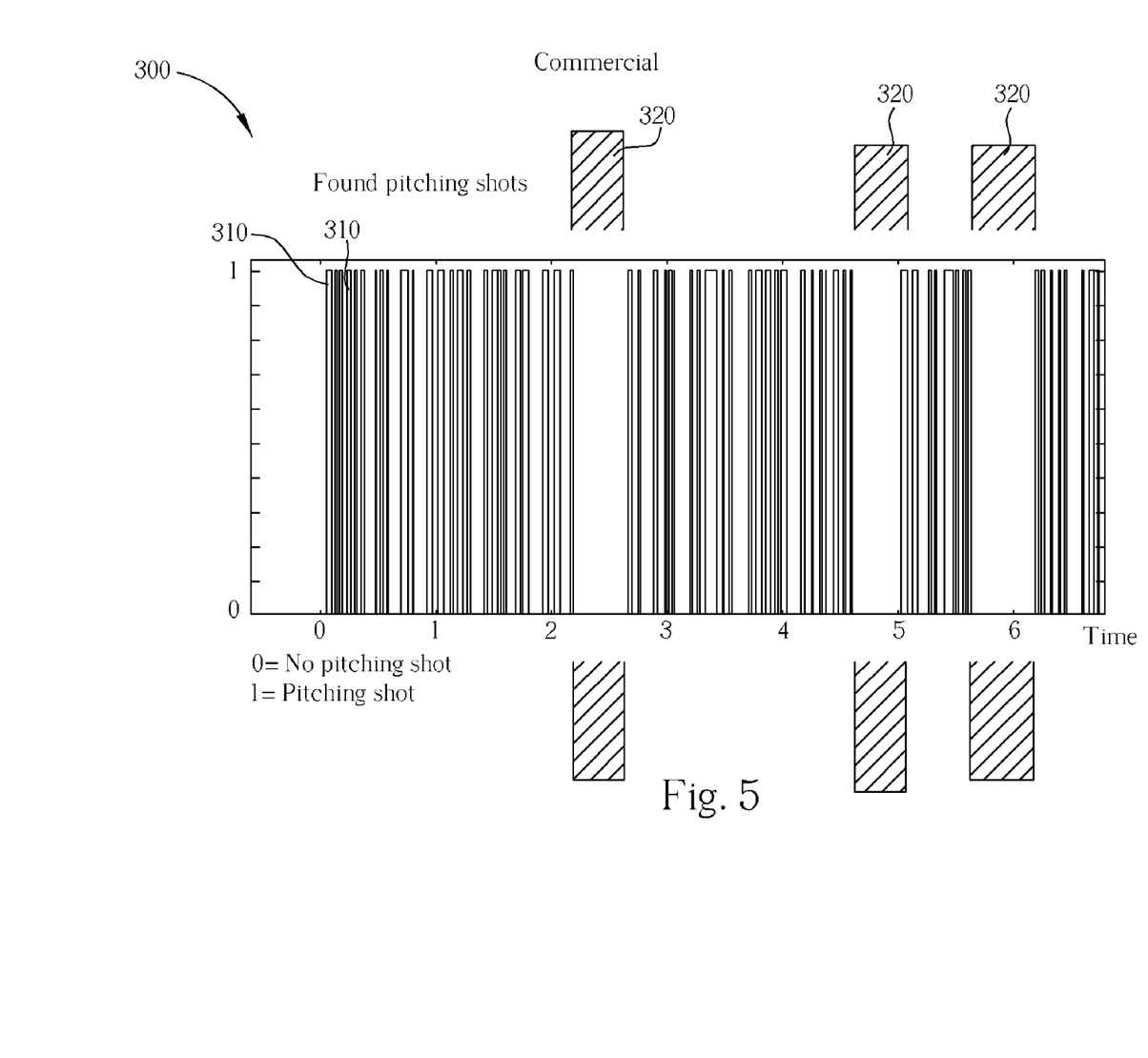
FIG. 5 is a timing diagram showing found pitching shots in a video segment.

An example of time interval lengths and their corresponding events are shown in FIG. 5. FIG. 5 is a timing diagram showing found pitching shots 310 in a video segment 300. The vertical axis shows values of "1" or "0", where "1" represents the presence of a pitching shot and "0" represents no pitching shot. The horizontal axis represents time, and indicates the duration of each pitching shot, the time interval between pitching shots, and the time interval of commercials 320. In general, there will be a longer time interval after the final pitching shot of each batter. Therefore, the time interval information can be a key indicator of which pitching shot is the final pitching shot. For instance, if the time interval between a current pitching shot and a next pitching shot is greater than a first predetermined time interval and less than a second predetermined time interval, the current pitching shot can be labeled as a final pitching shot.

Another good indicator of which pitching shots are the final pitching shots is the set of numerical indicators (the scoreboard indicator) that show the score and status of the game. This scoreboard indicator can be read using video OCR techniques for finding the characters in the video frames and recognizing the characters. For videos, it is difficult to use OCR unless some helping hints can be used about the characteristics of the video. For pitching shots, the position of the scoreboard indicator is usually fixed. For instance, it is often found in the upper left corner of the screen.

Figure 6:
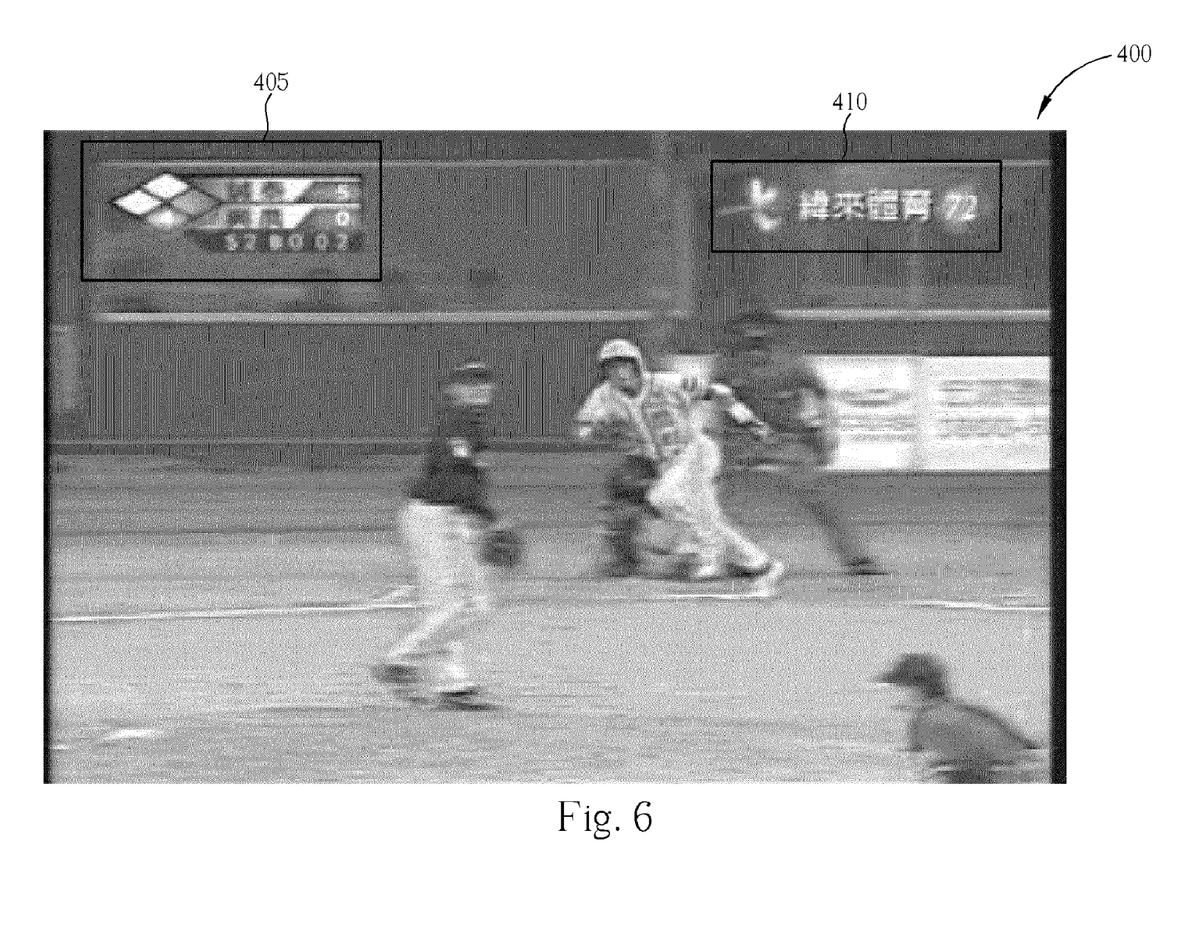
FIGS. 6 and 7 are two video frames taken in a pitching shot with actions.
Figure 7:
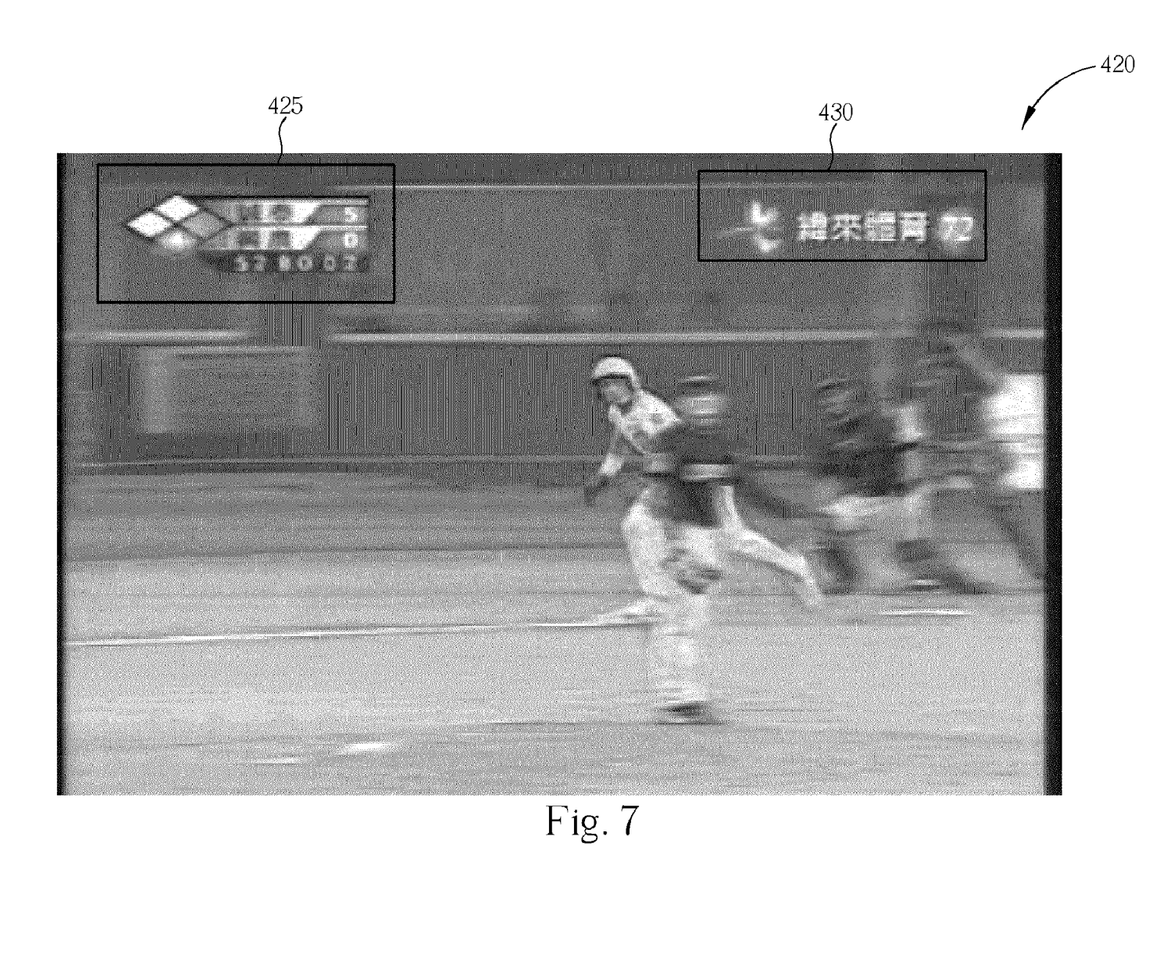
Figure 8:
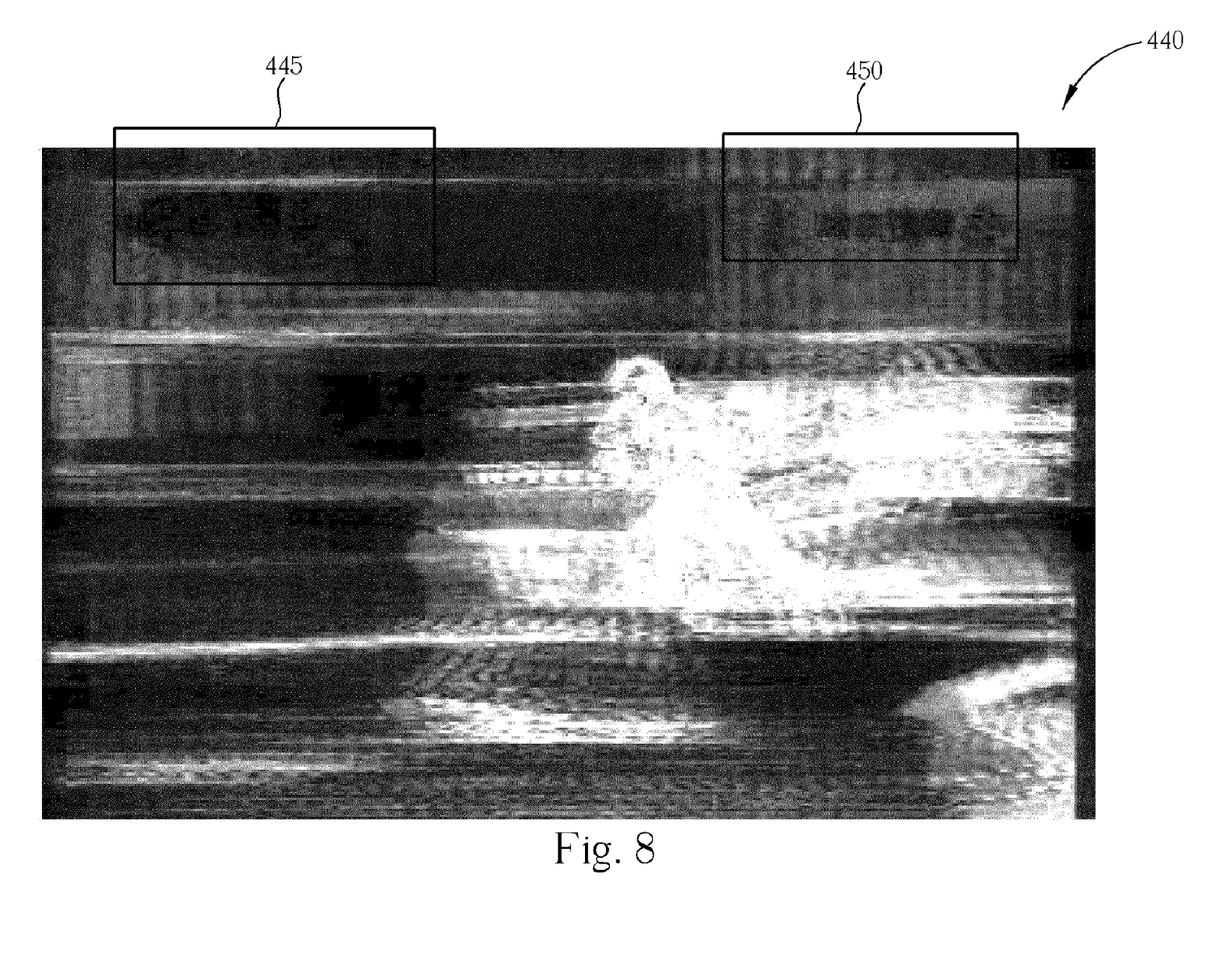
FIG. 8 shows the moving areas by comparing several consecutive pitching video frames.

In order to locate the scoreboard indicator, different video frames can be compared to determine which regions of the video frames are stable regions. Please refer to FIGS. 6-8. FIGS. 6 and 7 are two video frames 400, 420 taken during an action sequence. The video frame 400 contains a scoreboard indicator 405 in the upper left corner of the screen and a television station logo 410 in the upper right corner of the screen. Similarly, video frame 420 also contains a scoreboard indicator 425 and a television station logo 430 in these same positions. FIG. 8 shows a motion comparison 440 of the successive frames between the two video frames 400, 420. As shown in FIG. 8, regions 445 and 450 stable (having a black color) compared to areas where the batter is running (having a white color). As more video frames are compared, these two parts of the screen will remain very stable compared to the content of other parts of the video frames.

Figure 9:
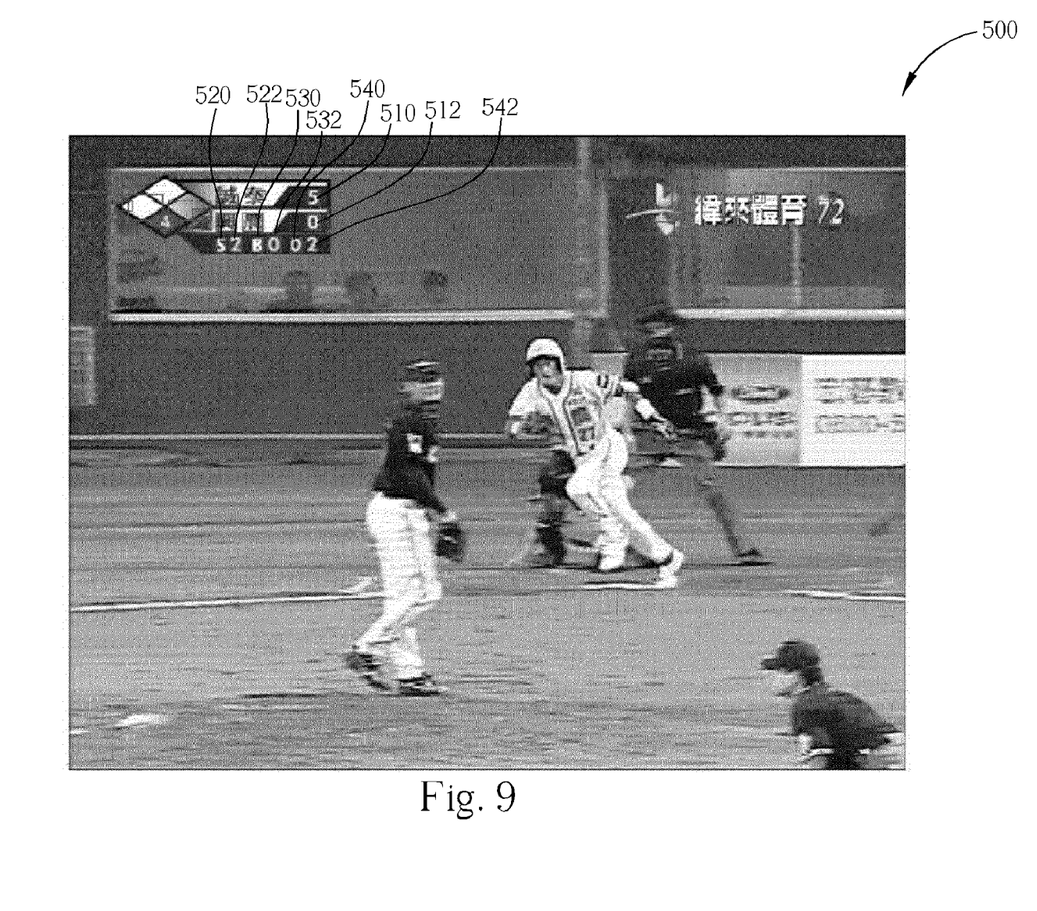
FIG. 9 illustrates a video frame that is analyzed for OCR results.

Once stable regions are found, areas containing characters readable through OCR techniques can be located and analyzed. Please refer to FIG. 9. FIG. 9 illustrates a video frame 500 that is analyzed for OCR results. As an example, several regions 510, 512, 520, 522, 530, 532, 540, 542 are selected for analysis through OCR techniques. Regions 510, 512 indicate the score of the visiting and home teams, respectively. Region 520 is the character "S" which stands for "strikes", and region 522 indicates the number of strikes that the pitcher has thrown to the current batter. Region 530 is the character "B" which stands for "balls", and region 532 indicates the number of balls that the pitcher has thrown to the current batter. Region 540 is the character "O" which stands for "outs", and region 542 indicates the number of outs that have been made in this half of the inning.

Unfortunately, the OCR results will not indicate the meaning of each number. Since the superimposed captions are different for different television stations, the meaning of the numbers located at each position cannot be specified. However, the meaning of the different numbers at specific locations can be learned by analyzing their repeated patterns and comparing these patterns to the measured time intervals. If we record the recognition results for each selected position, the results will have a special pattern that can be identified. For example, the number of strikes will be 0, 1, or 2 for each batter, the number of balls will be 0, 1, 2, or 3 for each batter, the number of outs will be 0, 1, or 2 for each inning, the number of innings will increase incrementally, and so on. Other characteristics of baseball games can be used to help understand the numbers captured through OCR. For example, the inning number will increase after every two long segments that are separated by commercials since commercials occur after the top and bottom of each inning. Therefore, finding which number captured through OCR corresponds to the inning number can be easily determined by analyzing the time intervals of the broadcast and the commercial breaks. Since the highest number of strikes that can be thrown for a single batter is 2 and the highest number of balls that can be thrown for a single batter is 3, the OCR results can also distinguish which numbers correspond to strikes and balls. In addition, the numbers of strikes and balls are reset for each new batter, so this information is highly useful in determining which pitching shot was the final pitching shot for a batter. After the final pitching shots are identified, an index of final pitching shots is created, thereby producing a concise summary of exciting parts of the baseball game.

Furthermore, once the meaning of these numbers captured through OCR is known, the numbers can be used to help index the type of event that are associated with the pitching shots. For example, segments of the baseball game in which a team scores could be extracted for producing highlights. For those pitching shots that produce a change in score, the pitching shot can be given the label of "home run" or "runs batted in" for giving more meaning to the index of pitching shots.

For extra accuracy, both the time intervals and the numbers captured through OCR can be used to determine which pitching shots are the final pitching shots, although either method can be used by itself as well.

In summary, the present invention provides a way to analyze a recorded video of a baseball game in order to create an index of final pitching shots for each batter. The final pitching shots are almost always the video clips that are included in highlight reels, and indexing the final pitching shots in a game makes it very convenient to view and extract highlights.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of indexing final pitching shots for each batter in
 a video recording of a baseball game, the method comprising:
 locating pitching video frames in the video;
 identifying individual pitching shots contained in the video;
 determining which of the pitching shots is a final pitching shot for each batter in the baseball game, comprising:
  calculating a time interval between the starts of successive pitching shots; and
  identifying a current pitching shot as a final pitching shot when the time interval between the current pitching shot and a following pitching shot is longer than a first predetermined length and less than a second predetermined length; and
 creating an index of the final pitching shots.

2. The method of claim 1, wherein locating pitching video frames in the video comprises:
 performing edge testing on video frames of the video; and
 classifying the video frames as pitching video frames according to the results of the edge testing of the video frames.

3. The method of claim 1, wherein identifying individual pitching shots comprises:
 analyzing histograms of video frames before and after the video frames classified as pitching video frames; and
 categorizing video frames into individual pitching shots when a histogram difference between histograms of sequential video frames is greater than a first predetermined difference value.

4. The method of claim 3, wherein identifying individual pitching shots further comprises self-validation for improving accuracy, the self-validation comprising:
 for each pitching shot, calculating histogram differences between the pitching shot and other pitching shots respectively, and accumulating the histogram differences to generate a difference value; and
 choosing pitching shot having smallest difference values as the desired pitching shots.

5. The method of claim 1, wherein determining which of the pitching shots is a final pitching shot for each batter in the baseball game comprises:
 locating an area on the video frames containing a superimposed caption;
 performing optical character recognition on the superimposed caption to obtain numerical information indicating the status of the game; and
 identifying a current pitching shot as a final pitching shot according to the obtained numerical information.

6. The method of claim 5, wherein identifying the current pitching shot as a final pitching shot comprises analyzing a current number of strikes, balls, and outs for determining the status of each batter.

7. The method of claim 5, wherein creating the index of the final pitching shots comprises:
 classifying an event associated with the final pitching shot according to the obtained numerical information indicating the status of the game; and
 indexing the final pitching shots along with the associated pitching event.

* * * * *